(12) United States Patent
Park

(10) Patent No.: US 12,412,934 B2
(45) Date of Patent: Sep. 9, 2025

(54) BATTERY PACK

(71) Applicant: SAMSUNG SDI CO., LTD., Yongin-si (KR)

(72) Inventor: Sanghun Park, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 658 days.

(21) Appl. No.: 17/696,087

(22) Filed: Mar. 16, 2022

(65) Prior Publication Data

US 2022/0302509 A1    Sep. 22, 2022

(30) Foreign Application Priority Data

Mar. 16, 2021 (KR) .................. 10-2021-0034239

(51) Int. Cl.
  *H01M 10/42* (2006.01)
  *H01M 50/528* (2021.01)
  *H02J 7/00* (2006.01)

(52) U.S. Cl.
  CPC ....... *H01M 10/425* (2013.01); *H01M 50/528* (2021.01); *H02J 7/0042* (2013.01)

(58) Field of Classification Search
  CPC ............. H01M 10/425; H01M 50/528; H01M 50/514; H01M 50/133; H01M 50/519; H01M 50/503; H01M 50/526
  See application file for complete search history.

(56) References Cited

U.S. PATENT DOCUMENTS

| 6,409,866 | B1 * | 6/2002 | Yamada | H01L 24/32 29/829 |
|---|---|---|---|---|
| 11,411,256 | B2 | 8/2022 | Lee et al. | |
| 2009/0280401 | A1 * | 11/2009 | Kim | H01M 50/581 429/120 |
| 2012/0052366 | A1 | 3/2012 | Park | |
| 2014/0120401 | A1 | 5/2014 | Shin et al. | |
| 2015/0044527 | A1 | 2/2015 | Nuedecker et al. | |

(Continued)

FOREIGN PATENT DOCUMENTS

| JP | 2004172295 A * | 6/2004 | ............... H05K 3/46 |
|---|---|---|---|
| JP | 2009-176792 A | 8/2009 | |
| KR | 10-1156266 B1 | 6/2012 | |

(Continued)

OTHER PUBLICATIONS

Translation of Japanese patent 'Circuit Board and Battery Unit' (Year: 2004).*

(Continued)

Primary Examiner — Nicholas A Smith
Assistant Examiner — Seamus Patrick McNulty
(74) Attorney, Agent, or Firm — Lee IP Law, P.C.

(57) ABSTRACT

A battery pack is provided. The battery pack includes a battery cell including an electrode extending in a first direction, a circuit portion connected to the electrode of the battery cell, and a connection portion forming a connection between the electrode of the battery cell and the circuit portion, the connection portion including a conductive thermocompression bonding layer and a conductive pad layer having a concave accommodation space formed in a second direction intersecting with the first direction to accommodate a portion of the conductive thermocompression bonding layer.

17 Claims, 9 Drawing Sheets

(56) References Cited

U.S. PATENT DOCUMENTS

2017/0207466 A1* 7/2017 Nishimura .......... H01M 50/557
2017/0208694 A1 7/2017 Hirata et al.

FOREIGN PATENT DOCUMENTS

| KR | 10-2015-0100148 A | 9/2015 |
| KR | 10-2016-0030278 A | 3/2016 |
| KR | 10-1956932 B1 | 3/2019 |
| KR | 10-2019-0065750 A | 6/2019 |

OTHER PUBLICATIONS

Office Action dated Dec. 29, 2023, of the corresponding CN Patent Application No. 202210256894.5.
European Search Report dated Oct. 31, 2022.

* cited by examiner

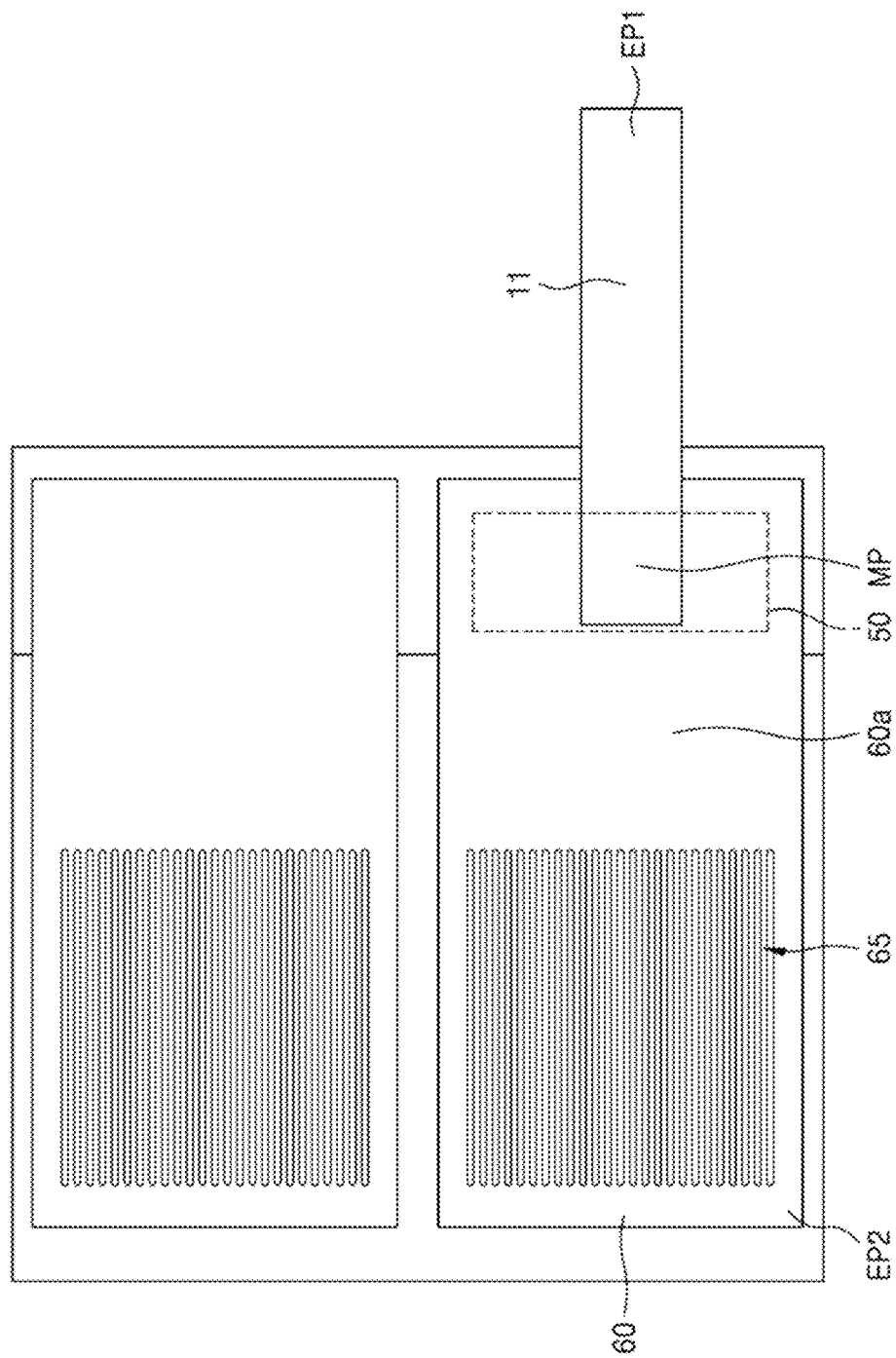

BATTERY PACK

CROSS-REFERENCE TO RELATED APPLICATION

This application is based on and claims priority under 35 U.S.C. § 119 to Korean Patent Application No. 10-2021-0034239, filed on Mar. 16, 2021, in the Korean Intellectual Property Office, the disclosure of which is incorporated by reference herein in its entirety.

BACKGROUND

1. Field

Embodiments relate to a battery pack.

2. Description of the Related Art

In general, secondary batteries are batteries that can be charged and discharged, unlike primary batteries that cannot be charged. Secondary batteries are used as energy sources for mobile devices, electric vehicles, hybrid vehicles, electric bicycles, uninterruptible power supply, etc. Secondary batteries may be used in the form of a single battery or in the form of a module bundled as a unit by connecting a plurality of batteries, depending on the type of external device to be applied.

SUMMARY

According to one or more embodiments, a battery pack includes: a battery cell including an electrode extending in a first direction; a circuit portion connected to the electrode of the battery cell; and a connection portion forming a connection between the electrode of the battery cell and the circuit portion, the connection portion including a conductive thermocompression bonding layer and a conductive pad layer having a concave accommodation space formed in a second direction intersecting with the first direction to accommodate a portion of the conductive thermocompression bonding layer.

The electrode may include a first electrode and a second electrode, arranged in a third direction intersecting with the first and second directions, the first and second electrodes having different polarities, wherein the conductive pad layer may include a first conductive pad layer and a second conductive pad layer, which are apart from each other in the third direction so as to be connected to the first electrode and the second electrode, respectively.

The conductive thermocompression bonding layer may be continuously formed in the third direction between the first electrode and the first conductive pad layer and between the second electrode and the second conductive pad layer.

The conductive thermocompression bonding layer may be between the electrode of the battery cell and the conductive pad layer in the second direction.

The conductive pad layer may include a convex portion relatively protruding in the second direction and a concave portion relatively concave in the second direction.

The concave portion may provide the concave accommodation space.

The conductive thermocompression bonding layer may include conductive particles supported on the convex portion and an insulating resin accommodated in the concave portion.

The convex portion and the concave portion may extend in parallel in the first direction.

The convex portion and the concave portion include the same metal material.

The conductive pad layer may include an uneven pattern in which the convex portion and the concave portion are alternately arranged in a third direction intersecting with the first and second directions.

The uneven pattern may be formed at a position biased close to a front position of the conductive pad layer facing the battery cell.

The uneven pattern may be completely surrounded by an edge portion of the conductive pad layer.

An insulating layer may be formed around the conductive pad layer.

At least some of edge portions of the conductive pad layer forming a boundary between the conductive pad layer and the insulating layer may form a step so that an upper surface of the conductive pad layer protrudes more prominently than an upper surface of the insulating layer in the second direction.

The step may be formed around an uneven pattern formed on the conductive pad layer.

The step may be formed around the conductive thermocompression bonding layer.

The edge portions of the conductive pad layer may include: a front edge portion formed at a position relatively close to the battery cell in the first direction; a rear edge portion formed at a position relatively far from the battery cell in the first direction; and a side edge portion connecting the front edge portion to the rear edge portion.

The step may be formed in a front portion of the side edge portion overlapping the uneven pattern in a third direction intersecting with the first and second directions.

The step may be formed in a front portion of the side edge portion overlapping the conductive thermocompression bonding layer in a third direction intersecting with the first and second directions.

The step may be formed in the front edge portion relatively close to the battery cell in the first direction.

BRIEF DESCRIPTION OF THE DRAWINGS

Features will become apparent to those of skill in the art by describing in detail example embodiments with reference to the attached drawings in which:

FIGS. 8A and 8B illustrate the structures of a comparative example and an example according to an embodiment, for measuring a connection resistance value between an electrode of a battery cell and a conductive pad layer.

DETAILED DESCRIPTION

Figure 1:
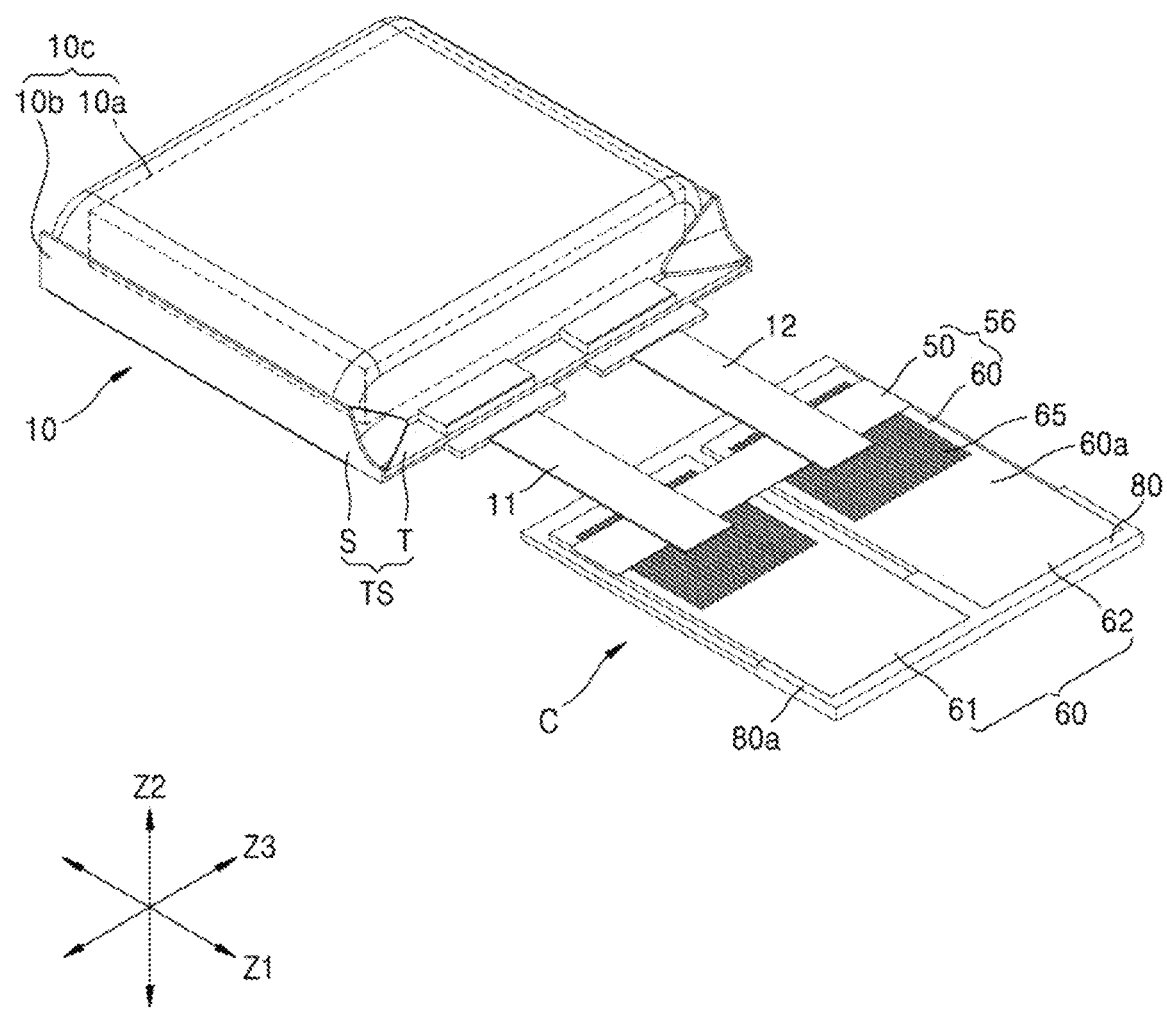
FIG. 1 is a perspective view of a battery pack according to an example embodiment.

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey example implementations to those skilled in the art. In the drawing figures, the dimensions of layers and regions may be exaggerated for clarity of illustration. Like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list.

Hereinafter, a battery pack according to an example embodiment will be described with reference to the accompanying drawings.

Figure 2:
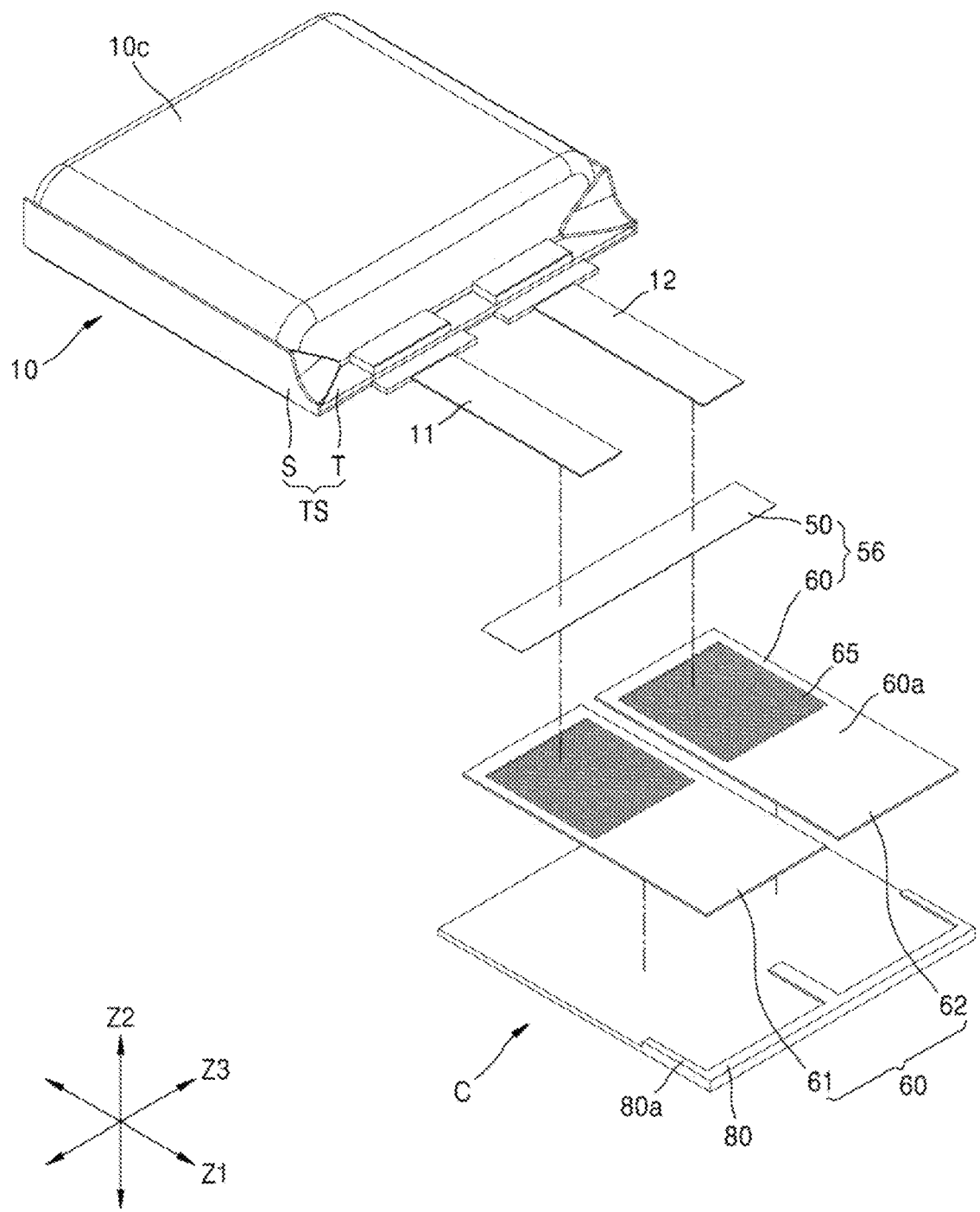
FIG. 2 is an exploded perspective view of the battery pack shown in FIG. 1.
Figure 3:
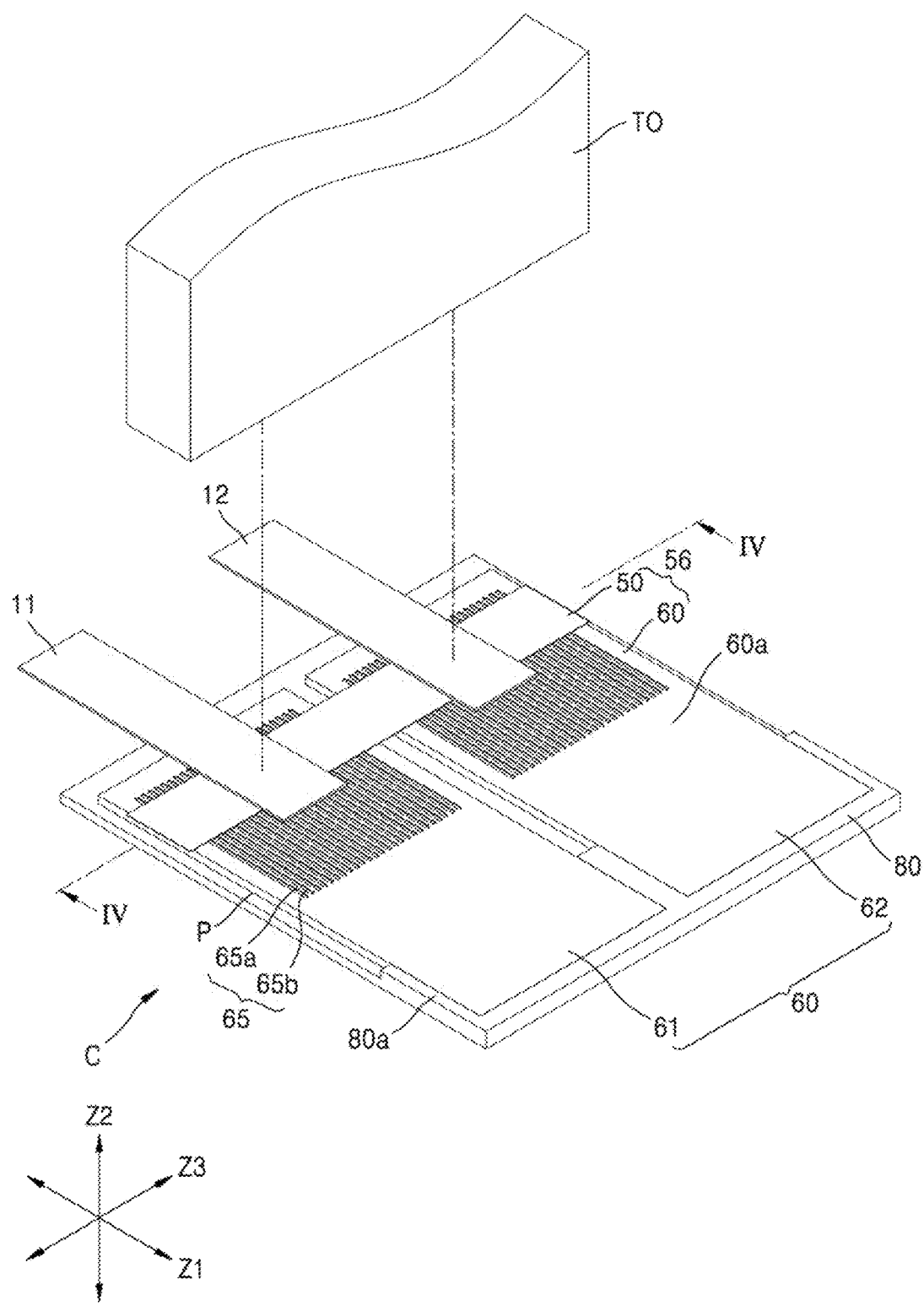
FIG. 3 is a perspective view of a portion of the battery pack shown in FIG. 1.
Figure 4:
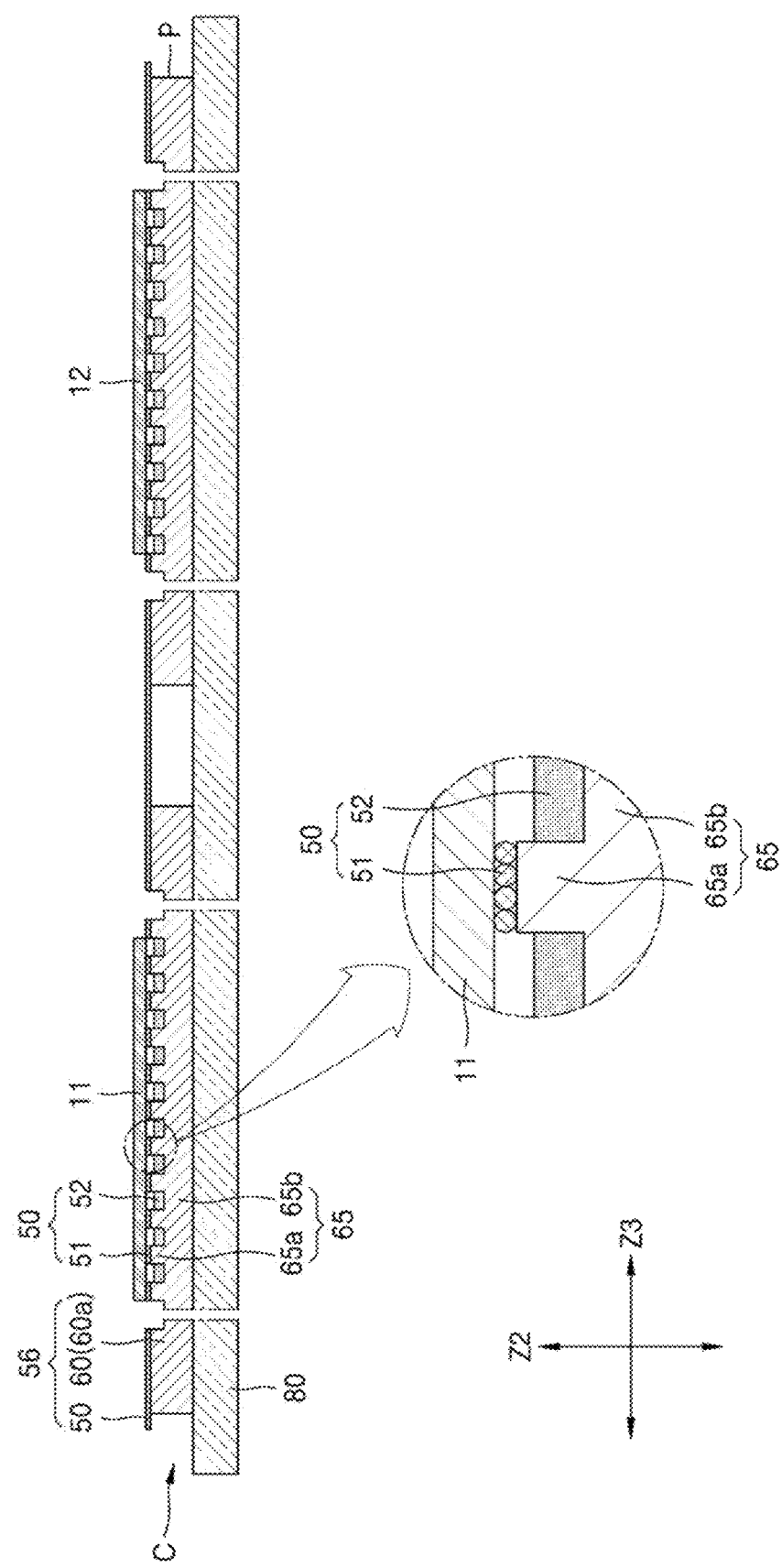
FIG. 4 is a cross-sectional view taken along line IV-IV of FIG. 3.
Figure 5:
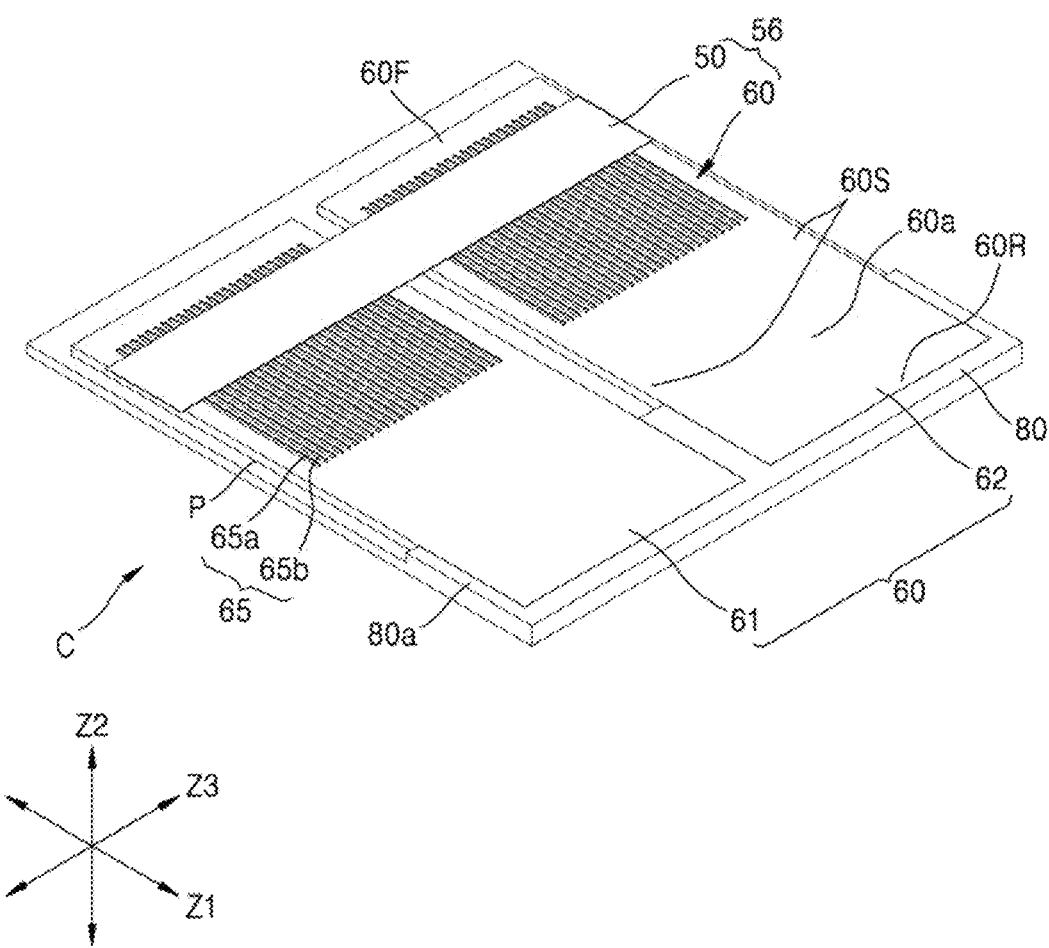
FIG. 5 is a perspective view of a portion of the battery pack shown in FIG. 1.
Figure 6:
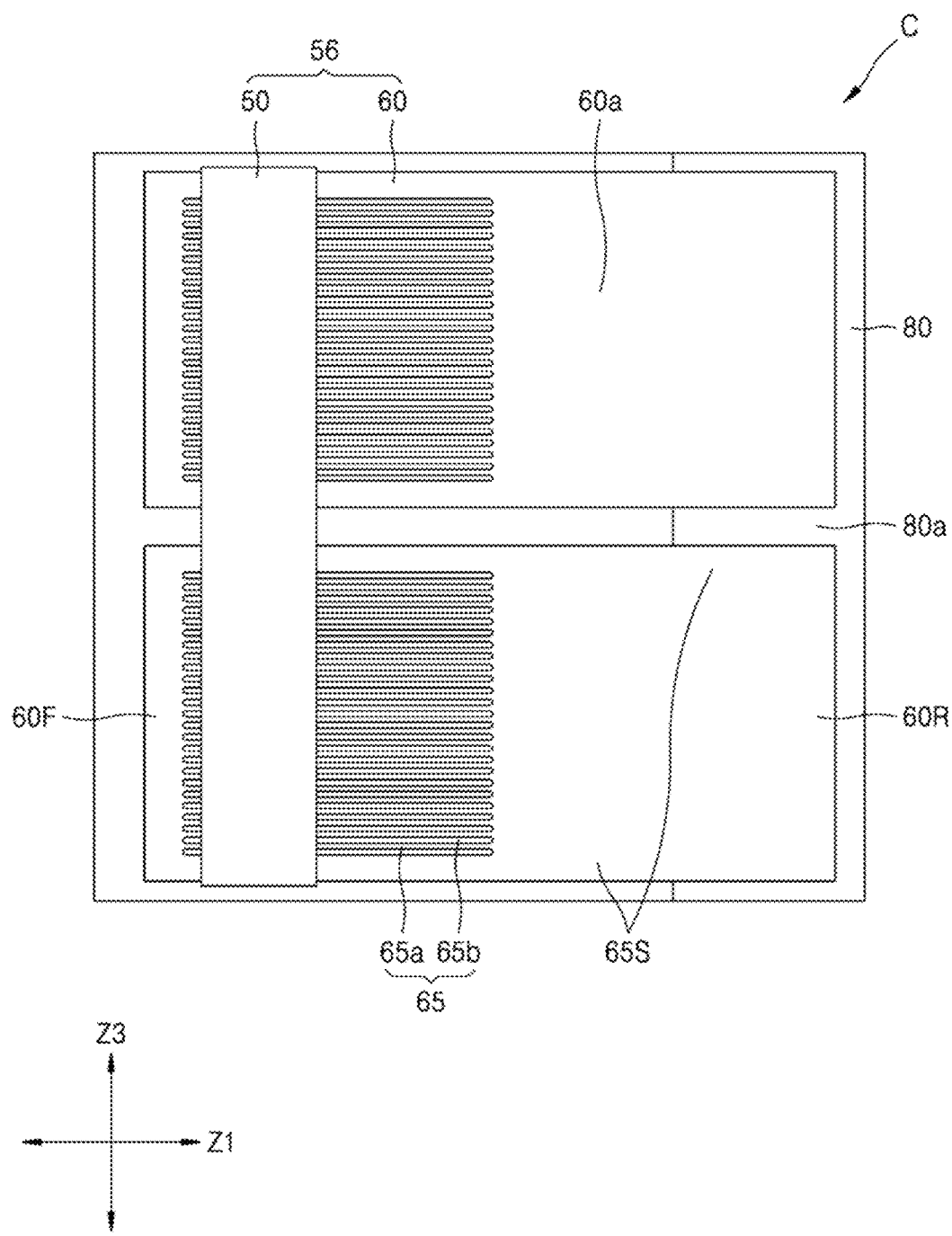
FIG. 6 is a plan view of a portion of the battery pack shown in FIG. 5.
Figure 7:
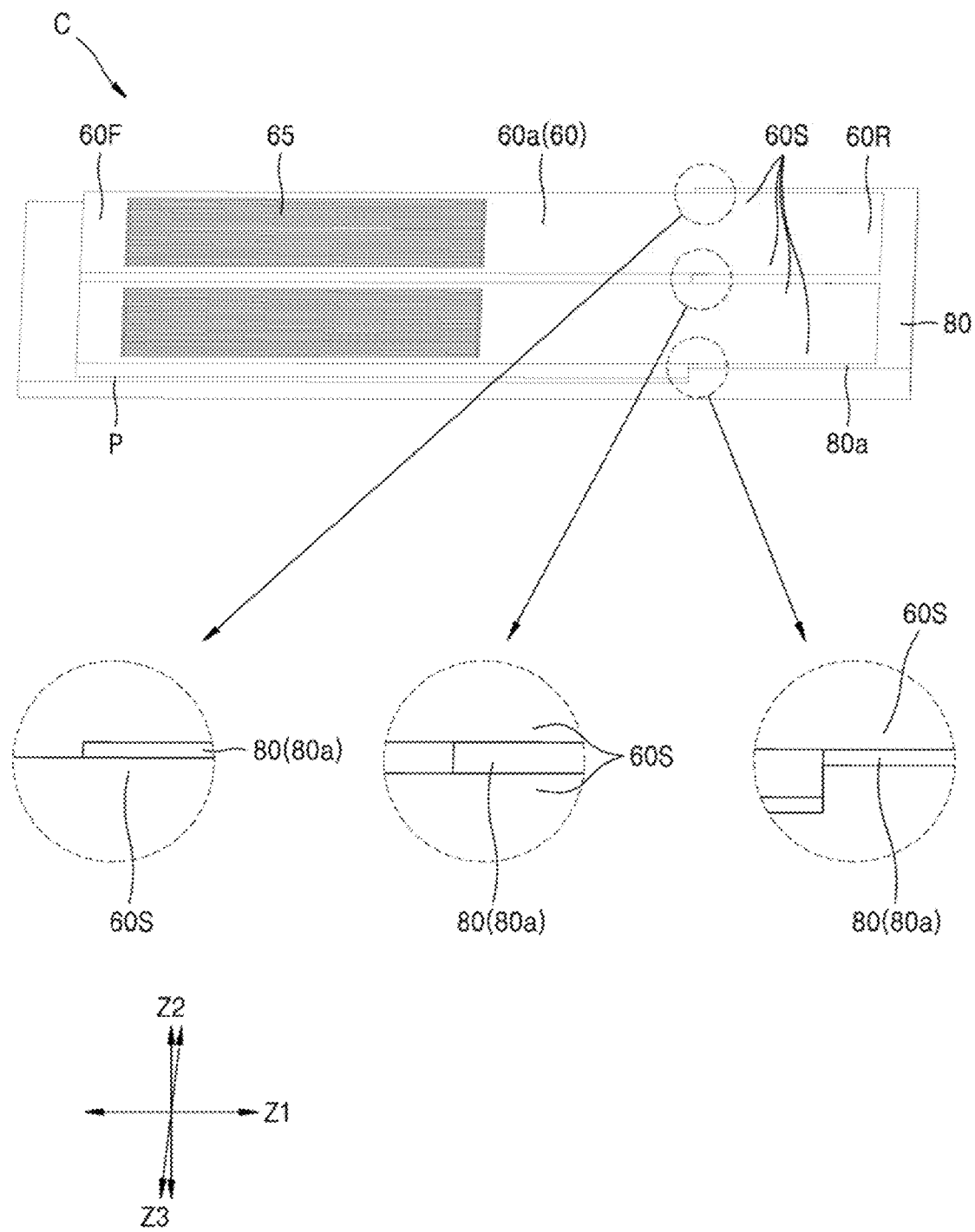
FIG. 7 is a perspective view of a portion of the battery pack shown in FIG. 1.

FIG. 1 is a perspective view of a battery pack according to an example embodiment. FIG. 2 is an exploded perspective view of the battery pack shown in FIG. 1. FIG. 3 is a perspective view of a portion of the battery pack shown in FIG. 1. FIG. 4 is a cross-sectional view taken along line IV-IV of FIG. 3. FIG. 5 is a perspective view of a portion of the battery pack shown in FIG. 1. FIG. 6 is a plan view of a portion of the battery pack shown in FIG. 5. FIG. 7 is a perspective view of a portion of the battery pack shown in FIG. 1.

Referring to FIGS. 1 and 2, a battery pack according to an example embodiment may include a battery cell 10, a circuit portion C, and a connection portion 56.

The battery cell 10 may include electrodes 11 and 12 extending in a first direction Z1.

The circuit portion C may be connected to the electrodes 11 and 12 of the battery cell 10.

The connection portion 56 may form a connection between the electrodes 11 and 12 of the battery cell 10 and the circuit portion C. The connection portion 56 may include a conductive thermocompression bonding layer 50 and a conductive pad layer 60. As described in additional detail below, the conductive pad layer 60 may have a concave accommodation space formed in a second direction Z2 (which intersects with the first direction Z1) to accommodate a portion of the conductive thermocompression bonding layer 50.

The battery cell 10 may include an electrode assembly 10a, a casing 10b surrounding the electrode assembly 10a, and the electrodes 11 and 12 drawn out from the casing 10b.

Although not shown in the drawings, the electrode assembly 10a may be formed as a winding type, in which first and second electrode plates and a separator between the first electrode plate and the second electrode plate are wound in a roll shape, or may be formed in a stacked type, in which the first and second electrode plates and the separator are stacked on each other.

The first and second electrode plates of the electrode assembly 10a may be electrically connected to the outside of the casing 10b through the electrodes 11 and 12 of the battery cell 10. The electrodes 11 and 12 of the battery cell 10 may be electrically connected to the first and second electrode plates of the electrode assembly 10a, respectively. The first electrode 11 and the second electrode 12 may have different polarities, respectively.

The casing 10b may be formed to surround the electrode assembly 10a. By sealing an excess portion of the casing 10b remaining after surrounding the electrode assembly 10a, a sealing portion TS for sealing the electrode assembly 10a may be formed. In this case, the battery cell 10 may include a body 10c including the electrode assembly 10a and the casing 10b surrounding the electrode assembly 10a, and a sealing portion TS formed along the periphery of the body 10c and including the casing 10b for sealing the electrode assembly 10a. In this case, the sealing portion TS may include the terrace portion T from which the electrodes 11 and 12 are drawn out, and may include, in addition to the terrace portion T, a side sealing portion S formed along the side of the body 10c of the battery cell 10.

The electrodes 11 and 12 of the battery cell 10 may be drawn out through the terrace portion T, and may be electrically connected to the circuit portion C through the connection portion 56, as will be described below. In an example embodiment, the electrodes 11 and 12 of the battery cell 10 may extend in the first direction Z1, and may be electrically connected to the circuit portion C arranged at a front position of the battery cell 10 in the first direction Z1.

In an example embodiment, the first direction Z1 may mean a direction in which the electrodes 11 and 12 of the battery cell 10 extend, or may mean a direction in which the battery cell 10 and the circuit portion C are arranged, or a direction in which the battery cell 10 and the circuit portion C face each other. In this case, the front position of the battery cell 10 in the first direction Z1 may mean a front position of the battery cell facing the circuit portion C. Similarly, the front position of the circuit portion C in the first direction Z1 may mean a front position of the circuit portion C facing the battery cell 10.

The electrodes 11 and 12 of the battery cell 10 may include the first electrode 11 and the second electrode 12, arranged in a third direction Z3. As will be described below, the first and second electrodes 11 and 12 having different polarities may be respectively connected to first and second conductive pad layers 61 and 62 arranged on the circuit portion C. A detailed technical configuration of the conductive pad layer 60 including the first and second conductive pad layers 61 and 62 will be described below in more detail.

The circuit portion C may form a charge and discharge path of the battery cell 10. In an example embodiment, the circuit portion C is to form a charge and discharge path connected to the electrodes 11 and 12 of the battery cell 10, and may form a charge and discharge path between the battery cell 10 and an external device. In an example embodiment, the external device may correspond to an external load receiving discharge power from the battery cell 10 or an external charger providing charging power toward the battery cell 10, and the circuit portion C may form a discharge path from the battery cell 10 to an external load or form a charge path from an external charger to the battery cell 10. In various embodiments, the circuit portion C may include the entire charge and discharge path between the battery cell 10 and an external device, or may include only a portion of the charge and discharge path between the battery cell 10 and the external device.

When the battery pack according to an example embodiment includes the circuit portion C electrically connected to the battery cell 10, the circuit portion C may include the entire charge and discharge path between the battery cell 10 and an external device, or may include only a portion of the charge and discharge path between the battery cell 10 and the external device. For example, the battery pack according to an example embodiment may include, as the circuit portion C electrically connected to the battery cell 10, various components as long as the circuit portion C is electrically connected to the battery cell 10 to form a charge and discharge path of the battery cell 10, and may not necessarily include all components connected to an external device.

The circuit portion C according to an example embodiment may include a circuit board connected to the battery cell 10, i.e., a circuit board having a conductive line for forming a charge and discharge path of the battery cell 10, such as a rigid circuit board including a relatively rigid insulating substrate or a flexible insulating board including a relatively soft insulating film. On the circuit board, a circuit element (not shown), which is capable of obtaining state information such as the voltage, current, and temperature of the battery cell 10 or is capable of controlling the charging and discharging operations of the battery cell 10 based on the obtained state information of the battery cell 10, may be arranged. In the drawings, the circuit portion C may include a circuit board including an insulating layer 80, and a conductive line (not shown) for forming a charge and discharge path of the battery cell 10 may be formed on the circuit board. In an example embodiment, the conductive line (not shown) may extend from the connection portion 56 connected to the electrodes 11 and 12 of the battery cell 10. When it is assumed throughout the present specification that the connection portion 56 forms a conductive connection between the electrodes 11 and 12 of the battery cell 10 and the circuit portion C, it may mean that the connection portion 56 forms a conductive connection between the electrodes 11 and 12 of the battery cell 10 and a conductive line of the circuit board, e.g., a conductive line formed on the insulating layer 80.

In an example embodiment, the circuit portion C may include a safety element (not shown) prepared on the charge and discharge path of the battery cell 10 and capable of blocking charge and discharge current of the battery cell 10 by capturing abnormal conditions such as overheating, overcharging, and overdischarging of the battery cell 10. For example, in an example embodiment, in order to forcibly reduce or block the charge and discharge current according to the overheating of the battery cell 10 when the battery cell 10 is overheated above a preset threshold temperature, the safety element (not shown) may be prepared on the charge and discharge path of the battery cell 10 and may include a variable resistor having resistance that varies with temperature. For example, in an example embodiment, the safety element may include a positive temperature coefficient (PTC), a thermal cut-off (TCO), or the like. For example, the circuit portion C may include both a circuit board on which a conductive line for forming a charge and discharge path of the battery cell 10 is formed and a safety element (not shown) arranged on the circuit board, or may include only a safety element (not shown) that is not supported by the circuit board.

In an example embodiment, the connection portion 56 may be between the battery cell 10 and the circuit portion C. The connection portion 56 may be between the battery cell 10 and the circuit portion C to form an electrical connection therebetween.

In an example embodiment, the connection portion 56 may include a conductive thermocompression bonding layer 50 and a conductive pad layer 60 having a concave accommodation space formed in the second direction Z2 to accommodate a portion of the conductive thermocompression bonding layer 50. In an example embodiment, the second direction Z2 may refer to a thickness direction of the conductive thermocompression bonding layer 50 or a thickness direction of the conductive pad layer 60, and may refer to a direction in which the conductive thermocompression bonding layer 50 is compressed or a direction in which the conductive pad layer 60 is compressed. The second direction Z2 may correspond to a direction intersecting with the first direction Z1 in which the electrodes 11 and 12 of the battery cell 10 extend and the third direction Z3 in which the electrodes 11 and 12 of the battery cell 10 are arranged. In an example embodiment, the second direction Z2 may correspond to a direction perpendicular to the first and third directions Z1 and Z3.

Referring to FIGS. 3 and 4, the conductive thermocompression bonding layer 50, which forms an electrical connection between the battery cell 10 and the circuit portion C, may have conductivity through thermocompression bonding between the battery cell 10 and the circuit portion C. In an example embodiment, the conductive thermocompression bonding layer 50 may refer to a component that does not have conductivity before thermocompression bonding, but has conductivity through thermocompression bonding. The conductive thermocompression bonding layer 50 according to an example embodiment is different from a metal member that may be recognized as a conductive material regardless of thermocompression bonding, and may refer to a component in which conductivity thereof may be differentiated before thermocompression bonding and after thermocompression bonding. That is, in an example embodiment, the conductive thermocompression bonding layer 50 may form an electrical connection between the electrodes 11 and 12 of the battery cell 10 and the circuit portion C through the conductive transition of the conductive thermocompression bonding layer 50, i.e., a transition from a non-conductive state (or an insulating state) before thermocompression bonding to a conductive state after thermocompression bonding. Throughout the present specification, the conductive transition of the conductive thermocompression bonding layer 50 may refer to a transition from a non-conductive state (or an insulating state) before thermocompression bonding to a conductive state after thermocompression bonding, and may refer to a transition to a conductive state through thermocompression bonding.

Referring to FIG. 4, in an example embodiment, the conductive thermocompression bonding layer 50 may include conductive particles 51 and an insulating resin 52 accommodating the conductive particles 51.

In an example embodiment, the insulating resin 52 may be in a solid phase below a transition temperature to thereby fix the conductive particles 51, and above the transition temperature, the insulating resin 52 may be changed to a liquid or gel phase that may have fluidity other than a solid phase and thus the conductive particles 51 dispersed in the insulating resin 52 may have fluidity. The conductive particles 51 having fluidity may be arranged between the electrodes 11 and 12 of the battery cell 10 and the circuit portion C to form a conductive connection. For example, as the insulating resin 52, which has fluidity above the transition temperature, is pushed out between the electrodes 11 and 12 of the battery cell 10 and the circuit portion C by a pressure provided with heat, i.e., a pressure provided in the second direction Z2 to make the electrodes 11 and 12 of the battery cell 10 and the circuit portion C approach each other, the remaining conductive particles 51 may electrically connect the electrodes 11 and 12 of the battery cell 10 to the circuit portion C.

The conductive pad layer 60 may be formed on the circuit portion C facing the electrodes 11 and 12 of the battery cell 10. Together with the conductive thermocompression bonding layer 50, the conductive pad layer 60 may form the connection portion 56 electrically connecting the battery cell 10 to the circuit portion C. In this case, the conductive pad layer 60 may help a conductive transition of the conductive thermocompression bonding layer 50 so that the conductive transition of the conductive thermocompression bonding layer 50 may be smoothly performed.

Hereinafter, a configuration will be described in which the conductive thermocompression bonding layer 50 and the conductive pad layer 60, which form the connection portion 56, cooperate with each other to form a conductive connection between the electrodes 11 and 12 of the battery cell 10 and the circuit portion C according to thermocompression bonding.

The conductive pad layer 60 may include a convex portion 65a that is relatively protruded in the second direction Z2, and a concave portion 65b that is relatively concave in the second direction Z2. In this case, the second direction Z2 may correspond to a thickness direction of the conductive pad layer 60, and may correspond to a direction in which the conductive thermocompression bonding layer 50 is compressed, as will be described below. The conductive pad layer 60 may have a configuration that may help the conductive transition of the conductive thermocompression bonding layer 50. For example, the convex portion 65a may provide a support base that supports the conductive particles 51 of the conductive thermocompression bonding layer 50, and the concave portion 65b may provide a concave accommodation space capable of accommodating the insulating resin 52 of the conductive thermocompression bonding layer 50.

In an example embodiment, the convex portion 65a and the concave portion 65b of the conductive pad layer 60 may form an uneven pattern 65 while being alternately arranged with respect to each other. For example, the convex portion 65a and the concave portion 65b of the conductive pad layer 60 may be alternately arranged in the third direction Z3 intersecting with the first direction Z1 in which the electrodes 11 and 12 of the battery cell 10 extend.

The conductive pad layer 60 may be formed by, e.g., selectively etching a plating layer formed on the circuit portion C. For example, a conductive pad layer 60 may be formed in which a convex portion 65a (which is not etched in a depth direction (i.e., the second direction Z2) of the plating layer) and a concave portion 65b (which is etched in the depth direction) are alternately arranged. In an example embodiment, the convex portion 65a and the concave portion 65b, which form the conductive pad layer 60, may be formed by selectively etching a plating layer including a metal material, and may include the same metal material. For example, the convex portion 65a and the concave portion 65b may include the same metal material to have substantially the same conductivity.

The convex portion 65a and the concave portion 65b may be alternately arranged in the third direction Z3 to form the uneven pattern 65. The uneven pattern 65 may include a plurality of convex portions 65a and a plurality of concave portions 65b, which are arranged in the third direction Z3. In an example embodiment, the convex portion 65a may include a plurality of convex portions 65a spaced apart from each other with the concave portion 65b therebetween. Each of the convex portions 65a and the concave portions 65b, arranged in plurality in the third direction Z3, may extend in the first direction Z1, and the convex portions 65a and the concave portions 65b may extend in parallel in the first direction Z1.

Referring to FIGS. 5 to 7, the conductive pad layer 60 may include a base portion 60a surrounding the uneven pattern 65 in which the plurality of convex portions 65a and the plurality of concave portions 65b are formed.

The base portion 60a may form edge portions 60F, 60S, and 60R of the conductive pad layer 60. For example, the base portion 60a may form the front edge portion 60F at a front position relatively close to the battery cell 10 so as to face the battery cell 10 in the first direction Z1, the rear edge portion 60R at a rear position relatively far from the battery cell 10, and the side edge portion 60S connecting the front edge portion 60F to the rear edge portion 60R. In an example embodiment, the conductive pad layer 60 may include a first conductive pad layer 61 and a second conductive pad layer 62, which are apart from each other. The edge portions 60F, 60S, and 60R of the conductive pad layer 60 may include edge portions 60F, 60S, and 60R of each of the first and second conductive pad layers 61 and 62. The side edge portion 60S may include a side edge portion 60S of each of the first and second conductive pad layers 61 and 62. The base portion 60a may form the edge portions 60F, 60S, and 60R of the conductive pad layer 60, may entirely surround the uneven pattern 65 formed in an inner region of the conductive pad layer 60, and may separately surround the uneven pattern 65 of each of the first and second conductive pad layers 61 and 62.

In an example embodiment, the uneven pattern 65 may correspond to a portion of the conductive pad layer 60 that forms physical contact with the electrodes 11 and 12 of the battery cell 10. The uneven pattern 65 may be formed at a position biased toward a front position of the conductive pad layer 60 relatively close to the battery cell 10 in the first direction Z1. Thus, the rear edge portion 60R (extending long in the first direction Z1 and having a flat plate shape) may be formed at a rear position of the conductive pad layer 60 that is relatively far from the battery cell 10.

As will be described below, around the uneven pattern 65 and around the conductive thermocompression bonding layer 50, a step P may be formed so that the upper surface of the conductive pad layer 60 protrudes more prominently than the upper surface of the insulating layer 80 surrounding the conductive pad layer 60. The step P may be formed in the front edge portion 60F facing the battery cell 10 and a front portion of the side edge portion 60S overlapping the uneven pattern 65 or the conductive thermocompression bonding layer 50 in the third direction Z3. Technical details regarding the step P between the conductive pad layer 60 and the insulating layer 80 will be described below in more detail.

The base portion 60a may protect the uneven pattern 65 while surrounding the uneven pattern 65, and may support the uneven pattern 65. For example, the base portion 60a may be formed at the same level as the convex portion 65a of the uneven pattern 65 in the second direction Z2, and may support a plurality of convex portions 65a while extending across one end and the other end of each of the plurality of convex portions 65a in the third direction Z3. The base portion 60a or the edge portions 60F, 60S, and 60R may entirely surround the uneven pattern 65 while extending in the first and third directions Z1 and Z3 to surround the uneven pattern 65.

In an example embodiment, the conductive pad layer 60 may be formed by selectively etching a plating layer formed on the circuit portion C. In this case, a non-etched portion may form the base portion 60a and the convex portion 65a, and a selectively etched portion may form the concave portion 65b. In an example embodiment, the conductive pad layer 60 may include a same metal material, as a whole. Thus, the base portion 60a, the convex portion 65a, and the concave portion 65b, which form the conductive pad layer 60, may all include the same metal material.

In an example embodiment, the metal material may be a metal material having excellent conductivity, and may include, e.g., aluminum or nickel.

In an example embodiment, the conductive pad layer 60 may include two or more different metal materials, e.g., first and second metal materials stacked on each other. Even in this case, because the base portion 60a, the convex portion 65a, and the concave portion 65b, which form the conductive pad layer 60, all include first and second metal materials stacked on each other, it may be said that the base portion 60a, the convex portion 65a, and the concave portion 65b include the same metal material.

As will be described below, the convex portion 65a may be connected to the electrodes 11 and 12 of the battery cell 10 through the conductive particles 51 (refer to FIG. 4) of the conductive thermocompression bonding layer 50. In addition, the convex portion 65a and the base portion 60a connected to the convex portion 65a may be connected to the circuit portion C. The conductive pad layer 60 including the convex portion 65a and the base portion 60a may form the charge and discharge path of the battery cell 10 between the battery cell 10 and the circuit portion C. Thus, the base portion 60a may provide a low-resistance charge and discharge path having a larger area than the convex portion 65a.

In an example embodiment, the electrodes 11 and 12 of the battery cell 10 may be connected to the circuit portion C through the convex portion 65a and the base portion 60a. The concave portion 65b including the same metal material as the convex portion 65a and the base portion 60a may also form a charge and discharge path through which the charge and discharge current of the battery cell 10 flows. However, as will be described below, the concave portion 65b may provide an accommodation space for accommodating the insulating resin 52 rather than being directly connected to the electrodes 11 and 12 of the battery cell 10 through the conductive particles 51 (refer to FIG. 4).

Throughout the present specification, that the conductive particles 51 (refer to FIG. 4) of the conductive thermocompression bonding layer 50 are connected to the electrodes 11 and 12 of the battery cell 10 does not mean that the formation of the charge and discharge path of the battery cell 10 is limited to the convex portion 65a providing a support base for the conductive particles 51 and the base portion 60a connected to the convex portion 65a. For example, in various embodiments of the disclosure, the charge and discharge path of the battery cell 10 may be formed through the entire conductive pad layer 60 including the uneven pattern 65 and the base portion 60a, the uneven pattern 65 including the convex portion 65a and the concave portion 65b. Similarly, in the present specification, that the battery cell 10 and the circuit portion C are connected to each other through the conductive particles 51 (refer to FIG. 4) arranged on the convex portion 65a does not mean that the charge and discharge path of the battery cell 10 is limited to the convex portion 65a, and the charge and discharge path of the battery cell 10 may be formed through part of the conductive pad layer 60 including the convex portion 65a or all of the conductive pad layer 60.

Referring to FIG. 4, the conductive pad layer 60 may be configured such that conductive transition of the conductive thermocompression bonding layer 50 that forms the connection portion 56 together with the conductive pad layer 60 may be smoothly performed. The convex portion 65a forming the uneven pattern 65 of the conductive pad layer 60 may provide a support base for the conductive particles 51 of the conductive thermocompression bonding layer 50. The concave portion 65b may provide a concave accommodation space capable of accommodating the insulating resin 52 of the conductive thermocompression bonding layer 50. When the conductive thermocompression bonding layer 50 is heated above the transition temperature, the insulating resin 52 of the conductive thermocompression bonding layer 50 may have fluidity, and may be accommodated in the concave accommodation space, provided by the concave portion 65b, while being pushed from the convex portion 65a into the concave portion 65b according to a pressure applied between the electrodes 11 and 12 of the battery cell 10 and the circuit portion C (i.e., according to a pressure applied in the second direction Z2 to make the electrodes 11 and 12 of the battery cell 10 and the circuit portion C approach each other), and the conductive particles 51 remaining on the convex portion 65a may electrically connect the electrodes 11 and 12 of the battery cell 10 to the circuit portion C.

The concave portion 65b may provide an accommodation space for accommodating the insulating resin 52 of the conductive thermocompression bonding layer 50, and may provide an accommodation space having sufficient volume to accommodate the insulating resin 52 so that the insulating resin 52 pushed into the accommodation space of the insulating resin 52 does not interfere with a conductive contact between the conductive particles 51 remaining on the convex portion 65a and the battery cell 10.

By way of comparison, a general structure may have a conductive pad layer 60 on a flat plate that is not provided with the uneven pattern 65, while being connected to the electrodes 11 and 12 of the battery cell 10. In such a general structure, because the conductive pad layer 60 on the flat plate does not provide a differentiated support base for each component of the conductive thermocompression bonding layer 50, the insulating resin 52 and the conductive particles 51 (which form the conductive thermocompression bonding layer 50) may be mixed and the insulating resin 52 may interfere with the contact of the conductive particles 51 to the electrodes 11 and 12 of the battery cell 10. This may result in an increase in electrical resistance between the electrodes 11 and 12 of the battery cell 10 and the conductive pad layer 60.

On the other hand, according to an example embodiment, the conductive pad layer 60 is connected to the electrodes 11 and 12 of the battery cell 10 through the uneven pattern 65 formed on the conductive pad layer 60. Thus, a differentiated support base may be provided for each component of the conductive thermocompression bonding layer 50 (i.e., the conductive particles 51 and the insulating resin 52) through the uneven pattern 65 of the conductive pad layer 60. The conductive pad layer 60 may support the conductive particles 51 through the convex portions 65a of the uneven pattern 65, and thus, an electrical connection between the conductive particles 51 remaining on the convex portion 65a and the electrodes 11 and 12 of the battery cell 10 may be made. In addition, as the insulating resin 52 is accommodated through the concave portion 65b of the uneven pattern 65, the insulating resin 52 may not interfere with the contact between the conductive particles 51 remaining and placed on the convex portion 65a and the electrodes 11 and 12 of the battery cell 10.

Referring again to FIG. 3, in the battery cell 10 according to an example embodiment, the first and second electrodes 11 and 12 having different polarities may be arranged in the third direction Z3 intersecting with the first direction Z1 in which the first and second electrodes 11 and 12 extend. The first and second electrodes 11 and 12 may be respectively connected to the first and second conductive pad layers 61 and 62, which are provided separately. That is, in an example embodiment, the conductive pad layer 60 may include the first and second conductive pad layers 61 and 62 that are apart from each other in the third direction Z3 and are respectively connected to the first and second electrodes 11 and 12 that are different from each other. In an example embodiment, the first and second conductive pad layers 61 and 62 may be electrically connected to the first and second electrodes 11 and 12 of the battery cell 10 through one conductive thermocompression bonding layer 50 continuously extending across the first and second conductive pad layers 61 and 62 in the third direction Z3.

In an example embodiment, the conductive thermocompression bonding layer 50 may have conductivity in the second direction Z2, and may electrically connect the first and second electrodes 11 and 12 of the battery cell 10 to the first and second conductive pad layers 61 and 62, the first and second electrodes 11 and 12 and the first and second conductive pad layers 61 and 62 being arranged to overlap each other in the second direction Z2 with the conductive thermocompression bonding layer 50 therebetween. However, the conductive thermocompression bonding layer 50 may have no conductivity in the third direction Z3, and thus may not cause an electrical short circuit between the first and second electrodes 11 and 12 of the battery cell 10 or between the first and second conductive pad layers 61 and 62. In an example embodiment, the conductive thermocompression bonding layer 50 may have anisotropy, in which conductive properties change depending on the direction, so that the conductive thermocompression bonding layer 50 has conductivity in the second direction Z2 and non-conductivity (or insulation) in the third direction Z3.

As described above, in an example embodiment, the first and second conductive pad layers 61 and 62 respectively connected to the first and second electrodes 11 and 12 having different polarities may be provided to be separated from each other, but the conductive thermocompression bonding layer 50 connecting the first electrode 11 to the first conductive pad layer 61 and connecting the second electrode 12 to the second conductive pad layer 62 may be provided as a single member continuously formed. Thus, the connection between the first and second electrodes 11 and 12 and the first and second conductive pad layers 61 and 62 may be collectively formed through one operation. In addition, the first and second electrodes 11 and 12 may be electrically connected to the first and second conductive pad layer 61 and 62, respectively, in the second direction Z2 by using the conductive thermocompression bonding layer 50 having anisotropy, which has different conductive properties depending on the direction, and an electrical short circuit between the first and second electrodes 11 and 12 and between the first and second conductive pad layers 61 and 62 in the third direction Z3 may also be prevented.

Referring to FIGS. 3 and 4, the conductive thermocompression bonding layer 50 according to an example embodiment may have conductivity according to thermocompression bonding. In this case, the conductive thermocompression bonding layer 50 may have conductivity according to a compression direction (corresponding to the second direction Z2) and may have non-conductivity (or insulation) in a direction different from the compression direction, e.g., in a direction perpendicular to the compression direction. For example, in an example embodiment, the conductive thermocompression bonding layer 50 may connect the electrodes 11 and 12 of the battery cell 10 to the conductive pad layer 60 while being compressed in the second direction Z2 corresponding to the compression direction. The conductive thermocompression bonding layer 50 may include a plurality of conductive particles 51 dispersed on the insulating resin 52. In addition, while the insulating resin 52 having fluidity according to heating is pushed in the second direction Z2 corresponding to the compression direction, the remaining conductive particles 51 may connect the electrodes 11 and 12 of the battery cell 10 to the conductive pad layer 60, the electrodes 11 and 12 and the conductive pad layer 60 overlapping each other in the second direction. However, in the third direction Z3 that does not correspond to the compression direction, electrical connection through the conductive particles 51 may be blocked as a plurality of conductive particles 51 are discontinuously arranged or the insulating resin 52 fills gaps between the plurality of conductive particles 51. In an example embodiment, the conductive thermocompression bonding layer 50 may include an anisotropic conductive film (ACF).

Referring to FIGS. 5 to 7, an insulating layer 80 surrounding the conductive pad layer 60 may be formed around the conductive pad layer 60. The insulating layer 80 may provide insulation with respect to the conductive pad layer 60. For example, the insulating layer 80 may provide electrical insulation between the conductive pad layer 60 and another conductive line of the circuit portion C.

In an example embodiment, the circuit portion C may include another conductive line insulated from a conductive line conducting electricity with the conductive pad layer 60. In this case, the insulating layer 80 may provide electrical insulation between the conductive pad layer 60 and the other conductive line.

The conductive pad layer 60 may be surrounded by the insulating layer 80. Throughout the present specification, that the conductive pad layer 60 is surrounded by the insulating layer 80 may mean that, as the conductive pad layer 60 is formed on the insulating layer 80 in the second direction Z2, the conductive pad layer 60 formed with a relatively narrow area is formed on the insulating layer 80 formed with a relatively large area. In an example embodiment, the conductive pad layer 60 may be formed in an inner region of the insulating layer 80 on a plane formed by the first and third directions Z1 and Z3, and the thickness of the conductive pad layer 60 in the second direction Z2 may be exposed from the insulating layer 80. That is, throughout the present specification, that the conductive pad layer 60 is surrounded by the insulating layer 80 may mean that the conductive pad layer 60 is formed in the inner region of the insulating layer 80 on a plane formed by the first and third directions Z1 and Z3. In this case, the conductive pad layer 60 may be formed in the inner region of the insulating layer 80 on a plane formed by the first and third directions Z1 and Z3, and the thickness of the conductive pad layer 60 may be exposed from the insulating layer 80 in the second direction Z2.

In an example embodiment, the thickness of the conductive pad layer 60 may be surrounded by the insulating layer 80 in the second direction Z2. For example, the conductive pad layer 60 may be formed in the inner region of the insulating layer 80 on a plane formed by the first and third directions Z1 and Z3, and at the same time, the thickness of the conductive pad layer 60 may be surrounded by the insulating layer 80 in the second direction Z2. However, as will be described below, even when the thickness of the conductive pad layer 60 is surrounded by the insulating layer 80, the thickness of the conductive pad layer 60 may be exposed around the uneven pattern 65 along the edge portions 60F, 60S, and 60R of the conductive pad layer 60. That is, the upper surface of the conductive pad layer 60 around the uneven pattern 65 may be formed at a level higher than the upper surface of the insulating layer 80, and the upper surface of the conductive pad layer 60 and the upper surface of the insulating layer 80 may be formed to be stepped in the second direction Z2. In other words, a step P, which is formed by the upper surface of the conductive pad layer 60 and the upper surface of the insulating layer 80, may be formed around the uneven pattern 65 along the edge portions 60F, 60S, and 60R of the conductive pad layer 60.

Referring to FIG. 3, in an example embodiment, the step P between the conductive pad layer 60 and the insulating layer 80 may be formed around the uneven pattern 65 in a boundary between the conductive pad layer 60 and the insulating layer 80. In this case, the periphery of the uneven pattern 65 may include a boundary, which overlaps the uneven pattern 65 in at least the third direction Z3, in the boundary between the conductive pad layer 60 and the insulating layer 80. The step P between the conductive pad layer 60 and the insulating layer 80 may significantly protrude the upper surface of the conductive pad layer 60 rather than the upper surface of the insulating layer 80, thereby providing effective pressure concentration for the conductive thermocompression bonding layer 50 formed on the conductive pad layer 60 and preventing a pressure gap of a pressing tool TO due to physical interference with the insulating layer 80.

In the thermocompression bonding, a certain heat and pressure may be provided to the conductive thermocompression bonding layer 50 between the electrodes 11 and 12 of the battery cell 10 and the conductive pad layer 60, thereby forming a conductive connection between the electrodes 11 and 12 of the battery cell 10 and the conductive pad layer 60. In this case, through the pressing tool TO pressing in the second direction Z to make the electrodes 11 and 12 of the battery cell 10 and the conductive pad layer 60 approach each other, the electrodes 11 and 12 and the conductive pad layer 60 being arranged to overlap each other with the conductive thermocompression bonding layer 50 therebetween, a certain heat and pressure may be applied to the conductive thermocompression bonding layer 50. In this case, a region pressed by the pressing tool TO corresponds to a pressing region to which the pressing tool TO is projected in the second direction Z2. In the pressing region of the pressing tool TO, the conductive pad layer 60 to be pressed may protrude in the second direction Z2 relative to the insulating layer 80 surrounding the conductive pad layer 60, and thus, effective pressurization of the conductive pad layer 60 rather than the insulating layer 80 may be made, and interference or a pressure gap caused by the insulating layer 80 may be prevented.

Referring to FIGS. 5 to 7, in an example embodiment, the step P between the upper surface of the conductive pad layer 60 and the upper surface of the insulating layer 80 may be formed around the uneven pattern 65 along the edge portions 60F, 60S, and 60R of the conductive pad layer 60, and may be formed in a side edge portion 60S of the conductive pad layer 60, which overlaps the uneven pattern in the third direction Z3. In an example embodiment, the step P of the conductive pad layer 60 may also be formed in a front edge portion 60F, formed at a position relatively close to the battery cell 10 to face the battery cell 10 in the first direction Z1, as well as the side edge portion 60S. In this case, the front edge portion 60F of the conductive pad layer 60 may refer to an edge portion, which faces the battery cell 10, i.e., is formed at a position relatively close to the battery cell 10, from among the edge portions 60F, 60S, and 60R of the conductive pad layer 60. In an example embodiment, a rear edge portion 60R (corresponding to the thickness of the rear edge portion 60R) of the conductive pad layer 60 formed at a position relatively far from the battery cell 10 may be surrounded by the insulating layer 80 in the second direction Z2. For example, the insulating layer 80 may include a thick portion 80a formed to have a relatively large thickness to surround the rear edge portion 60R (corresponding to the thickness of the rear edge portion 60R).

In an example embodiment, the conductive pad layer 60 may include a side edge portion 60S connecting the front edge portion 60F to the rear edge portion 60R, in addition to the front edge portion 60F and the rear edge portion 60R. In an example embodiment, in a front portion of the front edge portion 60F and the side edge portion 60S each formed around the uneven pattern 65, a step P for protruding the upper surface of the conductive pad layer 60 may be formed, and the rear edge portion 60R (corresponding to the thickness of the rear edge portion 60R) far from the uneven pattern 65 and a rear portion of the side edge portion 60S (corresponding to the thickness of the side edge portion 60S) may be surrounded by the insulating layer 80. For example, the insulating layer 80 may include a thick portion 80a formed to have a relatively large thickness to surround the rear edge portion 60R (corresponding to the thickness of the rear edge portion 60R) and the rear portion (corresponding to the thickness of the side edge portion 60S) of the side edge portion 60S. In an example embodiment, the thick portion 80a of the insulating layer 80 may provide insulation of the conductive pad layer 60 by surrounding the rear edge portion 60R (corresponding to the thickness of the rear edge portion 60R) and the rear portion (corresponding to the thickness of the side edge portion 60S) of the side edge portion 60S.

In an example embodiment, the step P between the conductive pad layer 60 and the insulating layer 80 may be formed around the uneven pattern 65.

In another example embodiment, the step P between the conductive pad layer 60 and the insulating layer 80 may be formed around the pressing region rather than around the uneven pattern 65. That is, because the step P is to provide effective pressurization to the conductive thermocompression bonding layer 50, formed on the conductive pad layer 60, by protruding the conductive pad layer 60 relative to the insulating layer 80, the step P may be formed around the pressing region, which corresponds to a projection region of the pressing tool TO (refer to FIG. 3), in the conductive pad layer 60.

For example, the pressing region of the conductive pad layer 60 may correspond to a projection region on which the pressing tool TO is projected in the second direction Z2 and may correspond to a projection region on which the conductive thermocompression bonding layer 50 to be pressed is projected. In an example embodiment, the pressing region may refer to a portion of the uneven pattern 65 overlapping the conductive thermocompression bonding layer 50, and may refer to a portion of the uneven pattern 65 overlapping the conductive thermocompression bonding layer 50 in the first direction Z1, rather than the entirety of the uneven pattern 65, and a step P for effective pressurization of the conductive thermocompression bonding layer 50 may be formed around a portion of the uneven pattern 65 overlapping the conductive thermocompression bonding layer 50. For example, the step P may be formed in a side edge portion 60S of the conductive pad layer 60 overlapping the conductive thermocompression bonding layer 50 in the third direction Z3, rather than being formed in a side edge portion 60S of the conductive pad layer 60 overlapping the entirety of the uneven pattern 65 in the third direction Z3.

The pressing region may extend in the third direction Z3 in which the first and second electrodes 11 and 12 are arranged. By applying the pressing tool TO (refer to FIG. 3)

along a pressing region extending across the first and second electrodes 11 and 12, a sufficient pressure may be applied to the conductive thermocompression bonding layer 50 between the first and second electrodes 11 and 12 and the first and second conductive pad layers 61 and 62. In this case, the pressing tool TO may press the conductive thermocompression bonding layer 50 between the first and second electrodes 11 and 12 and the first and second conductive pad layers 61 and 62 at a time through one pressurization to the pressing region.

In another example embodiment, the pressing tool TO may press the conductive thermocompression bonding layer 50 between the first and second electrodes 11 and 12 and the first and second conductive pad layers 61 and 62 at different times through divided pressurization to the pressing region.

The pressing tool TO may include a heater therein and may provide sufficient heat for connection between the electrode 11 and 12 of the battery cell 10 and the conductive pad layer 60, in addition to pressurization to the conductive thermocompression bonding layer 50.

In an example embodiment, the conductive pad layer 60 may be formed on the circuit portion C, and the insulating layer 80 may be formed as a portion of the circuit portion C. Through the present specification, the conductive pad layer 60 may be formed on the circuit portion C, and even though the insulating layer 80 is formed as a portion of the circuit portion C, the conductive pad layer 60 and the insulating layer 80 may be formed integrally with the circuit portion C. In an example embodiment, the circuit portion C may be formed to have a multilayer structure in which the insulating layer 80 is formed between a plurality of conductive lines, and the conductive pad layer 60 may be formed on the circuit portion C including the insulating layer 80 as one component. For example, a plating layer may be formed on the insulating layer 80 of the circuit portion C, and the conductive pad layer 60 having the uneven pattern 65 formed thereon may be formed by selectively etching the plating layer.

The following comparative example and example are provided in order to highlight characteristics of one or more embodiments, but it will be understood that the comparative example and the example are not to be construed as limiting the scope of the embodiments, nor is the comparative example to be construed as being outside the scope of the embodiments. Further, it will be understood that the embodiments are not limited to the particular details described in the comparative example and the example.

Figure 8B:
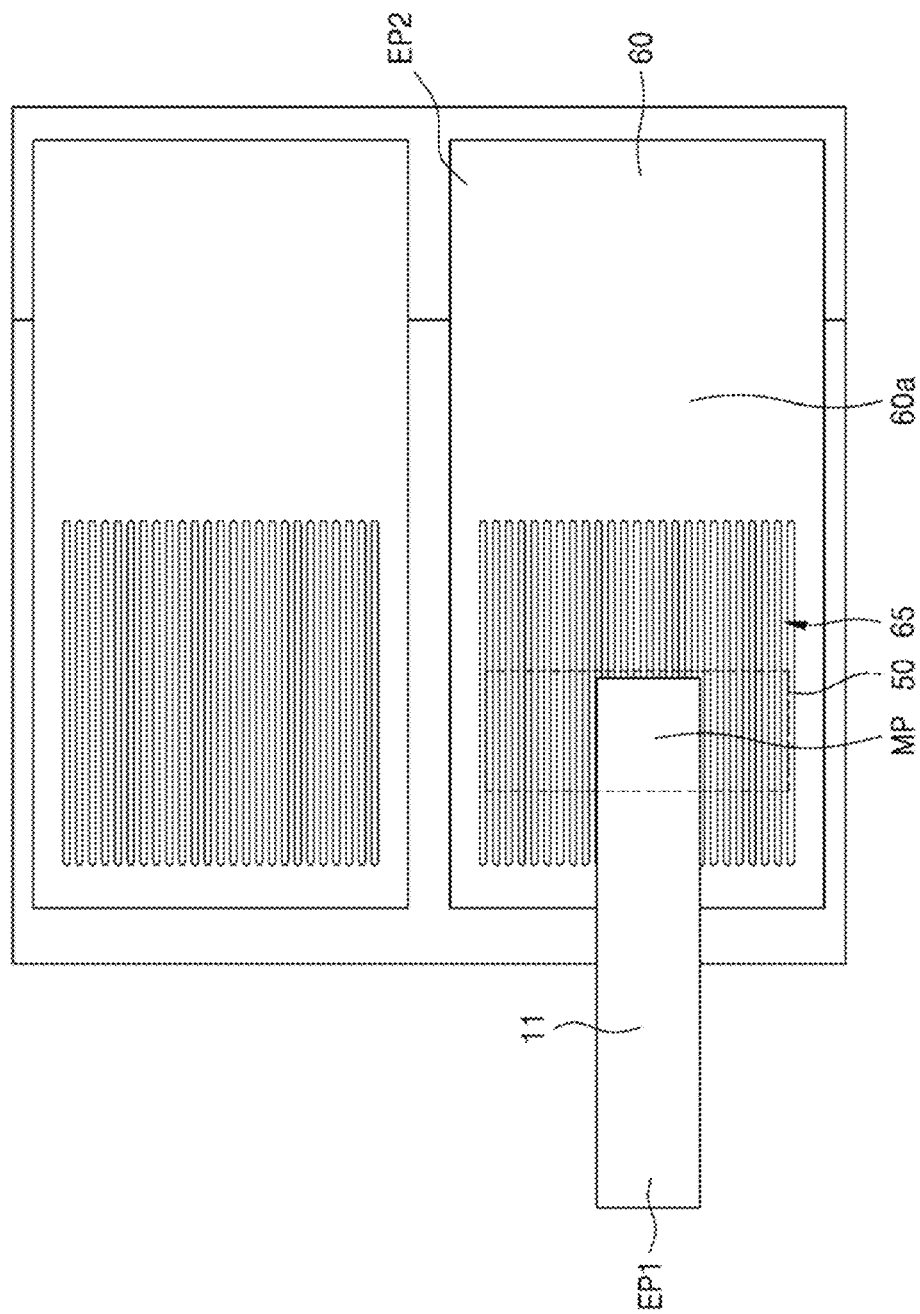

FIGS. 8A and 8B illustrate the structures of a comparative example and an example according to an embodiment, for measuring a connection resistance value between the electrode 11 of the battery cell 10 and the conductive pad layer 60, to show technical effects.

Referring to FIGS. 8A and 8B, connection resistance values measured on the charge and discharge path of the battery cell 10 were compared by measuring the value of a connection resistance between the electrode 11 of the battery cell 10 and the conductive pad layer 60 on the charge and discharge path of the battery cell 10 from the electrode 11 of the battery cell 10 to the conductive pad layer 60.

As discussed in detail below, through the comparison of the connection resistance values in the comparative example and the example according to an embodiment, it can be seen that the connection resistance value on the charge and discharge path is reduced in the example, as compared to the comparative example. In this case, the "connection resistance value" may refer to a resistance between the electrode 11 of the battery cell 10 and the conductive pad layer 60, the resistance being formed by the conductive thermocompression bonding layer 50.

More specifically, in this experiment, after the self-resistance value of each of the electrode 11 of the battery cell 10 and the conductive pad layer 60 is measured, a connection resistance value between the electrode 11 of the battery cell 10 and the conductive pad layer 60 is calculated by subtracting the previously measured self-resistance values of the electrode 11 of the battery cell 10 and the conductive pad layer 60 from a resistance value on the entire charge and discharge path between the electrode 11 of the battery cell 10 and the conductive pad layer 60.

In this experiment, two measurement points EP1 and EP2 were set on the charge and discharge path of the battery cell 10, which is formed between the electrode 11 of the battery cell 10 and the conductive pad layer 60. A middle measurement point MP was set at an intermediate position between the electrode 11 of the battery cell 10 and the conductive pad layer 60 where two end measurement points EP1 and EP2 corresponding to end positions on the charge and discharge path were set. The middle measurement point MP corresponds to a connection position between the electrode 11 of the battery cell 10 and the conductive pad layer 60.

Thus, in detail, three measuring points EP1, EP2, and MP (including two end measurement points EP1 and EP2 and one middle measurement point MP) were set.

A resistance value from the end measurement point EP1 (set on the electrode 11 of the battery cell 10) to the middle measurement point MP corresponds to the self-resistance value of the electrode 11 of the battery cell 10.

A resistance value from the end measurement point EP2 (set on the conductive pad layer 60) to the middle measurement point MP corresponds to the self-resistance value of the conductive pad layer 60.

A resistance value between the end measurement point EP1 and the end measurement point EP2 corresponds to a resistance value on the entire charge and discharge path.

Based on the above, the resistance value on the entire charge and discharge path refers to a resistance value measured in a connection state between the electrode 11 of the battery cell 10 and the conductive pad layer 60.

In this experiment, a connection resistance value between the electrode 11 of the battery cell 10 and the conductive pad layer 60 was calculated by first measuring self-resistance values of the electrode 11 of the battery cell 10 and the conductive pad layer 60, and then subtracting the previously measured self-resistance values of the electrode 11 of the battery cell 10 and the conductive pad layer 60 from a resistance value on the entire charge and discharge path between the electrode 11 of the battery cell 10 and the conductive pad layer 60.

In the above, because the connection resistance value between the battery cell 10 and the conductive pad layer 60 is calculated in an indirect method of subtracting the self-resistance values of the electrode 11 of the battery cell 10 and the conductive pad layer 60 from a resistance value on the entire charge and discharge path, rather than a direct measurement method, the connection resistance value may be obtained as a minus (−) value, and the minus (−) value may correspond to an experimental measurement error. That is, as in the experimental results of the disclosure, a minus (−) value may mean that the connection resistance value between the electrode 11 of the battery cell 10 and the conductive pad layer 60 may be reduced to a level close to zero.

Electrode Formed of a Nickel Material:

Tables 1 and 2 below show experimental results of resistance values measured in the comparative example and the example, respectively, for a case in which the electrode 11 of the battery cell 10 was formed of a nickel material.

The number of experiments performed in the comparative example is different from the number performed for the example.

Comparing the connection resistance value between the electrode 11 of the battery cell 10 and the conductive pad layer 60 in the comparative example to the connection resistance value between the electrode 11 of the battery cell 10 and the conductive pad layer 60 in the example, it may be seen that the connection resistance value in the example is remarkably reduced.

That is, in a case in which the conductive thermocompression bonding layer 50 mediating the connection between the electrode 11 of the battery cell 10 and the conductive pad layer 60 is formed on the uneven pattern 65 on the conductive pad layer 60 (as in the example), it may be seen that the connection resistance value between the electrode 11 of the battery cell 10 and the conductive pad layer 60 is significantly reduced, as compared to a case in which the conductive thermocompression bonding layer 50 mediating the connection between the electrode 11 of the battery cell 10 and the conductive pad layer 60 is formed on the base portion 60a of the conductive pad layer 60 in which the uneven pattern 65 is not formed (as in the comparative example).

TABLE 1

| No. | conductive pad layer | electrode of battery cell | resistance on entire charge and discharge path | connection resistance |
|---|---|---|---|---|
| 1 | 1.47 | 5.07 | 8.67 | 2.13 |
| 2 | 1.53 | 4.97 | 8.17 | 1.67 |
| 3 | 1.61 | 5.13 | 17.65 | 10.91 |

(resistance values; unit: mΩ)

TABLE 2

| No. | conductive pad layer | electrode of battery cell | resistance on entire charge and discharge path | connection resistance |
|---|---|---|---|---|
| 1 | 1.89 | 4.84 | 6.03 | −0.7 |
| 2 | 1.87 | 5.30 | 6.24 | −0.93 |
| 3 | 1.84 | 4.58 | 6.04 | −0.38 |
| 4 | 1.90 | 4.85 | 6.50 | −0.25 |
| 5 | 1.94 | 4.79 | 5.83 | −0.90 |
| 6 | 1.80 | 4.83 | 6.20 | −0.43 |
| 7 | 1.97 | 4.61 | 6.15 | −0.43 |
| 8 | 1.87 | 4.25 | 5.62 | −0.50 |
| 9 | 1.86 | 4.47 | 6.10 | −0.23 |
| 10 | 1.77 | 4.63 | 6.08 | −0.32 |

(resistance values; unit: mΩ)

Electrode Formed of an Aluminum Material:

Tables 3 and 4 below show experimental results of resistance values measured in the comparative example and the example, respectively, for a case in which the electrode 11 of the battery cell 10 is formed of an aluminum material.

The number of experiments performed in the comparative example is different form that performed in the embodiment of the disclosure.

Comparing the connection resistance value between the electrode 11 of the battery cell 10 and the conductive pad layer 60 in the comparative example to the connection resistance value between the electrode 11 of the battery cell 10 and the conductive pad layer 60 in the example, it may be seen that the connection resistance value in the embodiment of the disclosure is remarkably reduced.

That is, in a case in which the conductive thermocompression bonding layer 50 is formed on the uneven pattern 65 on the conductive pad layer 60 (as in the example), it may be seen that the connection resistance value between the electrode 11 of the battery cell 10 and the conductive pad layer 60 is significantly reduced, as compared to a case in which the conductive thermocompression bonding layer 50 is formed on the base portion 60a of the conductive pad layer 60 in which the uneven pattern 65 is not formed (as in the comparative example).

TABLE 3

| No. | conductive pad layer | electrode of battery cell | resistance on entire charge and discharge path | connection resistance |
|---|---|---|---|---|
| 4 | 1.51 | 1.63 | 8.22 | 5.08 |
| 5 | 1.57 | 1.58 | 89.20 | 86.05 |
| 6 | 1.52 | 1.44 | 9.80 | 6.84 |

(resistance values; unit: mΩ)

TABLE 4

| No. | conductive pad layer | electrode of battery cell | resistance on entire charge and discharge path | connection resistance |
|---|---|---|---|---|
| 11 | 2.06 | 1.69 | 2.93 | −0.82 |
| 12 | 2.06 | 1.63 | 2.82 | −0.87 |
| 13 | 1.99 | 1.49 | 2.89 | −0.59 |
| 14 | 2.03 | 1.49 | 2.92 | −0.60 |
| 15 | 2.10 | 1.60 | 2.91 | −0.79 |
| 16 | 2.11 | 1.40 | 2.71 | −0.80 |
| 17 | 1.93 | 1.42 | 2.90 | −0.45 |
| 18 | 1.94 | 1.53 | 2.89 | −0.58 |
| 19 | 1.95 | 1.55 | 2.85 | −0.65 |
| 20 | 2.03 | 1.48 | 2.85 | −0.66 |

(resistance values; unit: mΩ)

As described above, embodiments may provide a battery pack in which a connection process may be easily performed while increasing reliability of an electrical connection between a battery cell and a circuit portion forming a charge and discharge path of the battery cell.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
   a battery cell including an electrode extending in a first direction;
   a circuit portion connected to the electrode; and a connection portion connecting between the electrode and the circuit portion, the connection portion including:
a conductive thermocompression bonding layer, and
a conductive pad layer having a concave accommodation space in a second direction intersecting with the first direction to accommodate a first portion of the conductive thermocompression bonding layer, at least a second portion of the conductive thermocompression bonding layer being directly between the electrode and the conductive pad layer, wherein
the conductive pad layer includes convex portions relatively protruding in the second direction and concave portions relatively concave in the second direction,
the convex and concave portions are arranged in an alternating pattern and are directly connected to each other,
the convex and concave portions are integral with each other and include a same metal, and
the conductive thermocompression bonding layer includes conductive particles supported on the convex portions and an insulating resin accommodated in the concave portions.

2. The battery pack as claimed in claim 1, wherein:
the electrode includes a first electrode and a second electrode, arranged in a third direction intersecting with the first and second directions, the first and second electrodes having different polarities, and
the conductive pad layer includes a first conductive pad layer and a second conductive pad layer, which are apart from each other in the third direction so as to be connected to the first electrode and the second electrode, respectively.

3. The battery pack as claimed in claim 2, wherein the conductive thermocompression bonding layer is continuously formed in the third direction between the first electrode and the first conductive pad layer and between the second electrode and the second conductive pad layer.

4. The battery pack as claimed in claim 1, wherein the concave portions provide the concave accommodation space.

5. The battery pack as claimed in claim 1, wherein longitudinal directions of the convex portions and the concave portions extend in parallel to each other in the first direction and in parallel to an extension direction of the electrode.

6. The battery pack as claimed in claim 1, wherein the conductive pad layer includes an uneven pattern in which the convex portions and the concave portions are alternately arranged in a third direction intersecting with the first and second directions, the convex and concave portions alternating in a direction parallel to a short side of the battery cell through which the electrode extends.

7. The battery pack as claimed in claim 6, wherein the uneven pattern is formed at a position biased close to a front position of the conductive pad layer facing the battery cell.

8. The battery pack as claimed in claim 6, wherein the uneven pattern is completely surrounded by an edge portion of the conductive pad layer, a top surface of the edge portion of the conductive pad layer being coplanar with top surfaces of the convex portions.

9. The battery pack as claimed in claim 1, wherein an insulating layer is formed around the conductive pad layer.

10. The battery pack as claimed in claim 9, wherein at least some of edge portions of the conductive pad layer forming a boundary between the conductive pad layer and the insulating layer form a step so that an upper surface of the conductive pad layer protrudes more prominently than an upper surface of the insulating layer in the second direction.

11. The battery pack as claimed in claim 10, wherein the step is formed around an uneven pattern formed on the conductive pad layer.

12. The battery pack as claimed in claim 10, wherein the step is formed around the conductive thermocompression bonding layer.

13. The battery pack as claimed in claim 10, wherein the edge portions of the conductive pad layer include:
a front edge portion formed at a position relatively close to the battery cell in the first direction;
a rear edge portion formed at a position relatively far from the battery cell in the first direction; and
a side edge portion connecting the front edge portion to the rear edge portion.

14. The battery pack as claimed in claim 13, wherein:
the step is formed around an uneven pattern formed on the conductive pad layer, and
the step is formed in a front portion of the side edge portion overlapping the uneven pattern in a third direction intersecting with the first and second directions.

15. The battery pack as claimed in claim 13, wherein the step is formed in a front portion of the side edge portion overlapping the conductive thermocompression bonding layer in a third direction intersecting with the first and second directions.

16. The battery pack as claimed in claim 13, wherein the step is formed in the front edge portion relatively close to the battery cell in the first direction.

17. The battery pack as claimed in claim 1, wherein:
the conductive pad layer is between the circuit portion and an edge of the electrode, the edge of the electrode extending outside the battery cell, and
the conductive pad layer includes a first surface and a second surface opposite each other, the first surface including an uneven pattern with alternating convex and concave portions facing the edge of the electrode, and the second surface being entirely flat and facing the circuit portion.

* * * * *